(12) United States Patent
Kalayeh

(10) Patent No.: US 8,600,193 B2
(45) Date of Patent: Dec. 3, 2013

(54) IMAGE STITCHING AND RELATED METHOD THEREFOR

(75) Inventor: Hooshmand M. Kalayeh, Pittsford, NY (US)

(73) Assignee: Varian Medical Systems, Inc., Palo Alto, CA (US)

( * ) Notice: Subject to any disclaimer, the term of this patent is extended or adjusted under 35 U.S.C. 154(b) by 1348 days.

(21) Appl. No.: 12/174,106

(22) Filed: Jul. 16, 2008

(65) Prior Publication Data

US 2010/0014780 A1    Jan. 21, 2010

(51) Int. Cl.
*G06K 9/36* (2006.01)
*G06K 9/32* (2006.01)

(52) U.S. Cl.
USPC ............................................ 382/294; 382/284

(58) Field of Classification Search
USPC .................... 382/284, 128, 131, 132, 294
See application file for complete search history.

(56) References Cited

U.S. PATENT DOCUMENTS

| | | | | |
|---|---|---|---|---|
| 5,185,812 A * | 2/1993 | Yamashita et al. | ............ | 382/145 |
| 5,577,181 A * | 11/1996 | Givens et al. | ................. | 382/294 |
| 5,933,527 A * | 8/1999 | Ishikawa | ...................... | 382/190 |
| 6,011,558 A * | 1/2000 | Hsieh et al. | .................... | 345/629 |
| 6,694,064 B1 * | 2/2004 | Benkelman | .................... | 382/284 |
| 6,785,403 B1 * | 8/2004 | Murakami et al. | ........... | 382/104 |
| 7,596,284 B2 * | 9/2009 | Samadani | ..................... | 382/299 |
| 7,620,221 B2 * | 11/2009 | Florent et al. | ................. | 382/128 |
| 7,835,594 B2 * | 11/2010 | Riley et al. | .................... | 382/299 |
| 7,855,752 B2 * | 12/2010 | Baker et al. | ................... | 348/588 |
| 7,936,949 B2 * | 5/2011 | Riley et al. | ................... | 382/299 |
| 8,135,200 B2 | 3/2012 | Kalayeh | | |
| 8,466,915 B1 * | 6/2013 | Frueh | ............................. | 345/420 |
| 2002/0065466 A1 * | 5/2002 | Rather et al. | ................... | 600/447 |
| 2003/0103652 A1 * | 6/2003 | Lee et al. | ....................... | 382/118 |
| 2003/0190072 A1 * | 10/2003 | Adkins et al. | ................. | 382/154 |
| 2007/0127787 A1 * | 6/2007 | Castleman et al. | ........... | 382/118 |
| 2008/0130978 A1 * | 6/2008 | Neemuchwala et al. | ...... | 382/132 |
| 2008/0244648 A1 * | 10/2008 | Arfvidsson et al. | ........... | 725/38 |
| 2008/0260238 A1 * | 10/2008 | Pfister et al. | ................... | 382/154 |
| 2008/0292200 A1 * | 11/2008 | Kjeldsen et al. | .............. | 382/254 |

OTHER PUBLICATIONS

R. Wiemker, S. Dippel, M. Stahl, T. M. Buzug: A graph approach to automated shutter detection in digital X-Ray images, Proceedings of Computer Assisted Radiology and Surgery CARS 99 Paris, Jun. 1999, H.U.Lemke, M.W.Vannier, K.Inamura, A.G.Farman (Ed.), Elsevier Amsterdam, p. 14-18.

* cited by examiner

*Primary Examiner* — Michelle Entezari
(74) *Attorney, Agent, or Firm* — Vista IP Law Group, LLP

(57) ABSTRACT

A method to stitch images includes the steps of: determining a template window in the first digital image and a target window in the second digital image and extracting selected features from the selected windows and a template in the template window; extracting selected features from within the template at a first resolution; matching the selected features in the target window; extracting selected features from within the template and target window at a second resolution higher than the first resolution; matching the selected features in the target window; performing a first evaluation of the second estimate of the stitching location; blending the second estimate of the stitching location; performing an evaluation of the stitching location; stitching the first digital image and a second digital image using the stitching location to create a stitched image; and saving the stitched image to memory. A system to perform the method is also described.

33 Claims, 18 Drawing Sheets

Image Motion Correction Preprocessing
Sub-image size & shape selection

Image Smoothing

Examples of 3x3 and 5x5 Gaussian Kernel are shown here.

$\frac{1}{15}$

| 1 | 2 | 1 |
|---|---|---|
| 2 | 3 | 2 |
| 1 | 2 | 1 |

$\frac{1}{273}$

| 1 | 4 | 7 | 4 | 1 |
|---|---|---|---|---|
| 4 | 16 | 26 | 16 | 4 |
| 7 | 26 | 41 | 26 | 7 |
| 4 | 16 | 26 | 16 | 4 |
| 1 | 4 | 7 | 4 | 1 |

FIG. 6

Edge Detection

Examples of horizontal 3x3 and 5x5 Sobel Kernel are shown here. The vertical Sobel Kernel is the transpose of the horizontal one

| -1 | 0 | 1 |
|----|---|---|
| -2 | 0 | 2 |
| -1 | 0 | 1 |

| -2 | -1 | 0 | 1 | 2 |
|----|----|---|---|---|
| -3 | -2 | 0 | 2 | 3 |
| -4 | -3 | 0 | 3 | 4 |
| -3 | -2 | 0 | 2 | 3 |
| -2 | -1 | 0 | 1 | 2 |

FIG. 7A

The 3x3 Horizontal & Vertical Sobel Kernel

| -1 | 0 | +1 |
|----|---|----|
| -2 | 0 | +2 |
| -1 | 0 | +1 |

Gx

| +1 | +2 | +1 |
|----|----|----|
| 0  | 0  | 0  |
| -1 | -2 | -1 |

Horizontal & Vertical Projection

|  |  | Image |  |  | Horizontal Projection |
|---|---|---|---|---|---|
| 15.5923 | 13.6277 | 0.9340 | 2.6970 | 2.4847 | 7.0671 |
| 6.5743 | 0.3793 | 0.9093 | 2.2706 | 9.6317 | 3.9530 |
| 3.0288 | 0.3237 | 7.3947 | 15.8857 | 5.7854 | 6.4837 |
| 7.5373 | 6.3696 | 8.9184 | 6.5355 | 1.9622 | 6.2646 |
| 4.1849 | 14.0250 | 0.2976 | 1.0571 | 6.2029 | 5.1535 |

| 7.3835 | 6.9451 | 3.6908 | 5.6892 | 5.2134 |
|---|---|---|---|---|

Vertical Projection

FIG. 8A

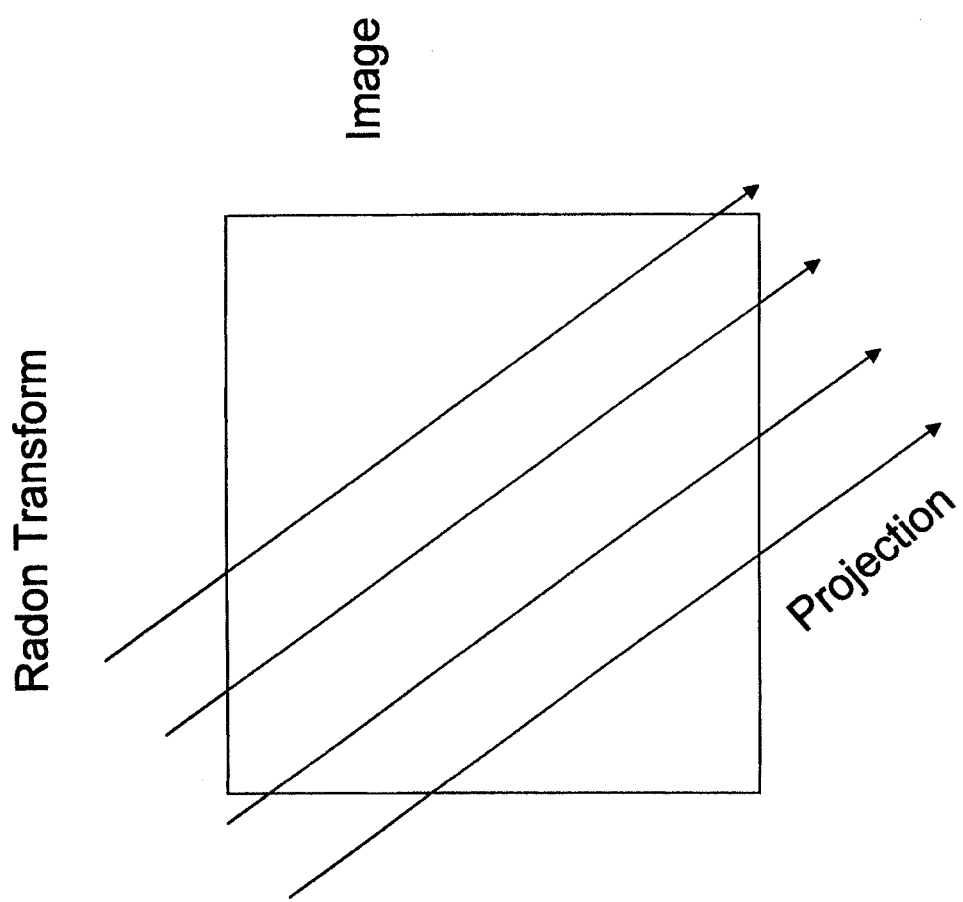

Selected Values
Selected gray & binary image

Image

```
17  24   1   8  15
23   5   7  14  16
 4   6  13  20  22
10  12  19  21   3
11  18  25   2   9
```

Binary Mask

```
1  0  0  1  1
0  0  0  1  1
0  0  1  1  0
1  1  1  0  0
1  1  0  0  1
```

Selected Values

```
17   0   0   8  15
 0   0   0  14  16
 0   0  13  20   0
10  12  19   0   0
11  18   0   0   9
```

The Binary Mask = (Image >7 & Image <21)

Horizontal & Vertical Projection of the Selected Values

Horizontal Projection of the selected values

Image

```
17  24   1   8  15
23   5   7  14  16
 4   6  13  20  22
10  12  19  21   3
11  18  25   2   9
```

Binary Mask

```
1  0  0  1  1
0  0  0  1  1
0  0  1  1  0
1  1  1  0  0
1  1  0  0  1
```

Selected Values | Horizontal Projection

```
17   0   0   8  15      40
 0   0   0  14  16      30
 0   0  13  20   0      33
10  12  19   0   0      41
11  18   0   0   9      38

38  30  32  42  40
   Vertical
   Projection
```

The Binary Mask = (Image >7 & Image <21)

Horizontal Mean of the Selected Values

Horizontal Mean of the selected values

Image

```
17  24   1   8  15
23   5   7  14  16
 4   6  13  20  22
10  12  19  21   3
11  18  25   2   9
```

Binary Mask

```
1  0  0  1  1
0  0  0  1  1
0  0  1  1  0
1  1  1  0  0
1  1  0  0  1
```

Selected Values

| | | | | | Horizontal Selected Mean |
|---|---|---|---|---|---|
| 17 | 0 | 0 | 8 | 15 | 13.33 |
| 0 | 0 | 0 | 14 | 16 | 15.000 |
| 0 | 0 | 13 | 20 | 0 | 16.500 |
| 10 | 12 | 19 | 0 | 0 | 13.666 |
| 11 | 18 | 0 | 0 | 9 | 12.666 |

12.666  15.000  16.000  14.000  13.333

Vertical Selected Mean

The Binary Image = (Image >7 & Image <21)

Binary Image
The Thresholding Concept

| Image | | | | | | Binary Image | | | | |
|---|---|---|---|---|---|---|---|---|---|---|
| 17 | 24 | 1 | 8 | 15 | | 1 | 0 | 0 | 1 | 1 |
| 23 | 5 | 7 | 14 | 16 | | 0 | 0 | 0 | 1 | 1 |
| 4 | 6 | 13 | 20 | 22 | ⇒ | 0 | 0 | 1 | 1 | 0 |
| 10 | 12 | 19 | 21 | 3 | | 1 | 1 | 1 | 0 | 0 |
| 11 | 18 | 25 | 2 | 9 | | 1 | 1 | 0 | 0 | 1 |

The Binary Image = (Image >7 & Image <21)

FIG. 12

Horizontal & Vertical Projection of the Binary Image

| Image | | | | | | Binary Image | | | | | Horizontal Projection |
|---|---|---|---|---|---|---|---|---|---|---|---|
| 17 | 24 | 1 | 8 | 15 | | 1 | 0 | 0 | 1 | 1 | 3 |
| 23 | 5 | 7 | 14 | 16 | ⇒ | 0 | 0 | 0 | 1 | 1 | 2 |
| 4 | 6 | 13 | 20 | 22 | | 0 | 0 | 1 | 1 | 0 | 2 |
| 10 | 12 | 19 | 21 | 3 | | 1 | 1 | 1 | 0 | 0 | 3 |
| 11 | 18 | 25 | 2 | 9 | | 1 | 1 | 0 | 0 | 1 | 3 |

3 2 2 3 3
Vertical Projection

The Binary Image = (Image >7 & Image <21)

FIG. 13

IMAGE STITCHING AND RELATED METHOD THEREFOR

FIELD OF THE INVENTION

This invention relates generally to a method for combining multiple overlapping images and more particularly to a method for image stitching.

BACKGROUND OF THE INVENTION

Images having low or high resolution are typically captured by use of a camera, Charge Coupled Device (CCD), IR camera, or Flat Panel Detector (FPD) with a visible, Infrared, or X-ray light source, respectively. In many cases, such as in medical radiography applications, it might not be possible to capture the whole object of interest in a single field of view or a single image. Therefore, multiple views of an area of interest are typically acquired as multiple images by automatically (synchronously) or manually (asynchronously) moving the sensor and light source with respect to the object of interest. Physical movement of the sensor and light source can be accomplished by horizontal movement only, vertical movement only, both horizontal and vertical movement, or rotational movement.

In Digital Radiographic (DR) applications, both the X-ray light source and FPD are typically moved vertically or horizontally in order to acquire multiple images (e.g. of a patient's spine or leg for scoliosis or long bone study for bone alignment, or for other physiological measurements). Clinicians, however, generally prefer a single image showing "a whole region of interest" for medical study and diagnosis. Yet, because of the large size of some objects of interest, e.g. long bones, or a very high resolution requirement for a small object, multiple image acquisition is the only viable option. Stitching algorithms exist that can combine multiple images (e.g. sequences of images) into a single overall image of the region of interest.

What is needed is a stitching method that can more accurately and more efficiently fuse (combine) multiple sequences of images to create a single image of interest from multiple acquired images.

SUMMARY OF THE INVENTION

According to one aspect, a method to stitch images includes the steps of: providing a first digital image and a second digital image; reading the first digital image and the second digital image; determining a first Region of Interest (ROI) in the first digital image and a second ROI in the second digital image; determining a template window in the first digital image and a target window in the second digital image and a template in the template window; smoothing an image within the template and the target window; extracting selected features from within the template and the target window at a first resolution; matching the selected features of the template to features in the target window at a first resolution to make a first estimate of a stitching location; extracting selected features from within the template and target window at a second resolution higher than the first resolution; matching the selected features of the template to features in the target window at a second resolution to make a second estimate of the stitching location; performing a first evaluation of the second estimate of the stitching location; blending the second estimate of the stitching location; performing an evaluation of the stitching location; stitching the first digital image and a second digital image using the stitching location to create a stitched image; and saving the stitched image to memory.

In one embodiment, the method further includes the step of iteratively performing the steps: the step of extracting selected features to the step of performing an evaluation, until the second evaluation yields a stitching performance at or better than a pre-determined stitching performance level.

In another embodiment, the step of determining a template window includes determining a template window in the first digital image and a target window in the second digital image and a template in the template window wherein the template is substantially the same as the template window.

In yet another embodiment, the step of determining a template window includes determining a template window in the first digital image and a target window in the second digital image and a template in the template window wherein the template is smaller than the template window.

In yet another embodiment, the step of smoothing an image includes smoothing an image within the template and the target window by use of a Gaussian kernel.

In yet another embodiment, the steps of extracting selected features include at least a selected one of: extracting selected one dimensional (1D) features and extracting selected two dimensional (2D) features.

In yet another embodiment, at least one of the steps of extracting selected features includes extracting selected features based on at least one Radon transform.

In yet another embodiment, at least one of the steps of extracting selected features includes extracting selected features based on at least one feature selected from the group of features consisting of: gray-scale features, edge features, and range features.

In yet another embodiment, at least one of the steps of extracting selected features includes extracting selected features based on at least one feature selected from the group of features consisting of: selected gray mean features, selected edge mean features, and selected range mean features.

In yet another embodiment, at least one of the steps of extracting selected features includes extracting selected features based on at least one feature selected from the group of features consisting of: selected gray sum features, selected edge sum features, and selected range sum features.

In yet another embodiment, at least one of the steps of extracting selected features includes extracting selected features based on at least one feature selected from the group of features consisting of: thresholded gray features, thresholded edge features, and thresholded range features.

In yet another embodiment, at least one of the steps of extracting selected features includes extracting selected gray scale features based on at least one gray scale feature selected from the group of gray scale features consisting of: gray-scale features, smoothed gray-scale features, selected gray mean features, selected gray sum features, and thresholded gray features.

In yet another embodiment, at least one of the steps of extracting selected features includes extracting selected edge features based on at least one edge feature selected from the group of edge features consisting of: edge features, selected edge mean features, selected edge sum features, and thresholded edge features.

In yet another embodiment, at least one of the steps of extracting selected features includes extracting selected range features based on at least one range feature selected from the group of range features consisting of: range features, selected range features, selected range mean features, selected range sum features, and thresholded range features.

In yet another embodiment, at least one of the steps of matching selected features of the template to features in the target window includes a template matching algorithm.

In yet another embodiment, the template matching algorithm includes at least one mean square distance computation.

In yet another embodiment, the template matching algorithm includes at least one least squares computation.

In yet another embodiment, the template matching algorithm includes at least one Euclidian distance computation.

In yet another embodiment, at least one of the steps of matching selected features of the template to features in the target window includes a stitching location that falls substantially along a row or column.

In yet another embodiment, at least one of the steps of performing an evaluation of the stitching location includes at least one 2D city block distance.

In yet another embodiment, at least one of the steps of performing an evaluation of the stitching location includes at least one 1D city block distance.

In yet another embodiment, at least one of the steps of performing an evaluation of the stitching location includes at least one 2D normalized city block distance.

In yet another embodiment, at least one of the steps of performing an evaluation of the stitching location includes at least one 2D normalized cross correlation.

In yet another embodiment, at least one of the steps of performing an evaluation of the stitching location includes at least one 1D normalized city block distance.

In yet another embodiment, at least one of the steps of performing an evaluation of the stitching location includes at least one 1D normalized cross correlation.

In yet another embodiment, at least one of the steps of performing an evaluation of the stitching location includes a quantitative evaluation threshold based on a pre-determined similarity distance obtained from one or more stitched images deemed by visual inspection to have an acceptable stitched quality.

In yet another embodiment, the step of blending includes blending the second estimated stitching location into a stitching location by use of the blending algorithm:

alfa=$(1*i)$/(Numbe_Of_Rows_Overlapped_Region)

OVERLAP$(i,j)$=(1−alfa)*OVERLAP1$(i,j)$+
alfa*OVERLAP2$(i,j)$

For_all_$(i,j)$.

According to another aspect, a method to stitch images, the method including the steps of: providing a first digital image and a second digital image; reading the first digital image and the second digital image; determining a first Region of Interest (ROI) in the first digital image and a second ROI in the second digital image; step for determining a template window in the first digital image and a target window in the second digital image and a template in the template window; smoothing an image within the template and the target window; step for extracting selected features from within the template and the target window at a first resolution; step for matching the selected features of the template to features in the target window at a first resolution to make a first estimate of a stitching location; step for extracting selected features from within the template and target window at a second resolution higher than the first resolution; step for matching the selected features of the template to features in the target window at a second resolution to make a second estimate of the stitching location; step for performing a first evaluation of the second estimate of the stitching location; step for blending the second estimate of the stitching location; step for performing an evaluation of the stitching location; stitching the first digital image and a second digital image using the stitching location to create a stitched image; and saving the stitched image to memory.

According to another aspect, an imaging system includes a source of imaging radiation having a shutter. The imaging system also includes a detector for detecting an absorbed, transmitted, or projection of the imaging radiation in a plane. The imaging system also includes an imaging computer component communicatively coupled to the detector and configured to run an auto autostitching algorithm to stitch images together, wherein the autostitching algorithm is configured to read the first digital image and the second digital image, determine a first Region of Interest (ROI) in the first digital image and a second ROI in the second digital image, determine a template window in the first digital image and a target window in the second digital image and a template in the template window, smooth an image within the template and the target window, extract selected features from within the template and the target window at a first resolution, match the selected features of the template to features in the target window at a first resolution to make a first estimate of a stitching location, extract selected features from within the template and target window at a second resolution higher than the first resolution, match the selected features of the template to features in the target window at a second resolution to make a second estimate of the stitching location, perform a first evaluation of the second estimate of the stitching location, blend the second estimate of the stitching location, perform an evaluation of the stitching location, stitch the first digital image and a second digital image using the stitching location to create a stitched image, and save the stitched image to memory.

In one embodiment, the source of imaging radiation includes an X-ray source.

BRIEF DESCRIPTION OF THE DRAWINGS

For a further understanding of these and objects of the invention, reference will be made to the following detailed description of the invention which is to be read in connection with the accompanying drawings, where:

FIG. 6 shows two numerical examples of image smoothing using 3×3 and 5×5 Gaussian kernels;

FIG. 7A shows a numerical example of a 3×3 or 5×5 Sobel horizontal and vertical kernel convolved with a template window and a target window;

FIG. 7B shows a vertical Sobel kernel as a transpose of a horizontal Sobel kernel;

FIG. 8A shows a numerical example of a horizontal projection which transforms a 2D image into two 1D signals using horizontal and vertical projections;

FIG. 8B shows an exemplary graphical projection of a Radon transform;

FIG. 12 shows a numerical example of a transformation of a gray scale image to a binary imaging using the threshold method;

FIG. 13 shows both horizontal and vertical projections of the binary image of FIG. 12;

The drawings are not necessarily to scale, emphasis instead generally being placed upon illustrating the principles of the invention. In the drawings, like numerals are used to indicate like parts throughout the various views.

DETAILED DESCRIPTION

Definitions

Figure 1A:
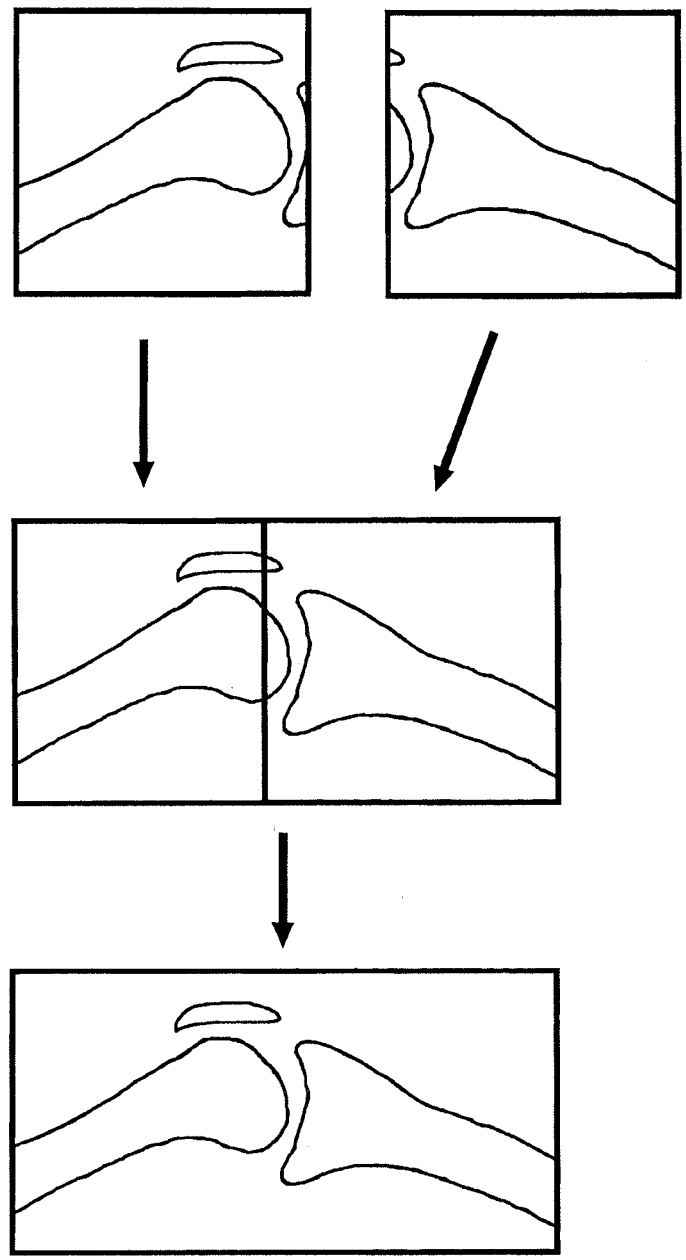
FIG. 1A shows two exemplary images having a horizontal overlap.

Combining or "stitching" multiple images herein refers to substantially seamlessly joining two images having some finite overlap region. The words "fuse" or "fusing" are used synonymously to refer to the stitching process. Typically two images are joined at a time; more images can be joined by repeating the process.

A "template" is an area (region) defined within an image. In the context of image stitching, the template typically includes part or all of a region within an overlapping area of two images to be fused. As part of the image stitching method, a template selected from the first window, the "template window" is matched with a second window, the "target window", by searching in the target window for the most similar image to the template. The template window and the target window typically include a common area or "overlap region" where the first and second images overlap each other.

A "mean projection of an image" is considered herein to be a subset of the larger set of mathematical Radon transforms. By standard definition, Radon transforms, as shown in FIG. 8B can be performed on or off-axis with respect to a two dimensional Cartesian coordinate system. In general, a "Radon transform" is the integral of an N-dimensional function over a hyperplane. For a 2D function, the Radon transform is the integral of the function over a line. In image processing, a Radon transform is the projection of image intensity along a radial line oriented at a specific angle. For example, horizontal and vertical projections are commonly used for Radon transforms in image processing.

"Saving" or recording data such as intermediate data, calculations, or the results of an auto stitching operation to memory, such as for example, recording auto stitching and image information is understood to mean and defined herein as "writing" output data to a storage element or device. For example, recording the auto stitching and/or image data for further processing or as output data can include, but is not limited to, writing data to random access memory ("RAM") (volatile or non-volatile), SRAM, DRAM, and EEPROM. Such digital memory elements or chips can be standalone memory devices, or can be incorporated within a programmable array, such as a field programmable array ("FPGA"), or within a microcomputer. Saving auto stitching and/or image data as defined herein, also includes writing transformed data to registers within a microcomputer. Memory elements or devices can also include other writing means, such as writing digital data to a magnetic storage device, such as a hard drive, magnetic technology disc, or other disc media, such as an optical CD media, or DVD media.

"Microcomputer" is defined herein as synonymous with microprocessor, microcontroller, and digital signal processor ("DSP"). It is understood that memory used by the microcomputer, including for example an auto stitching algorithm coded as "firmware" can reside in memory physically inside of a microcomputer chip or in memory external to the microcomputer or in a combination of internal and external memory. Similarly, analog signals can be digitized by one or more ADCs or multiplexed ADC channels that can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer. A "computer" as used herein is understood to include one or more microcomputers.

Figure 1B:
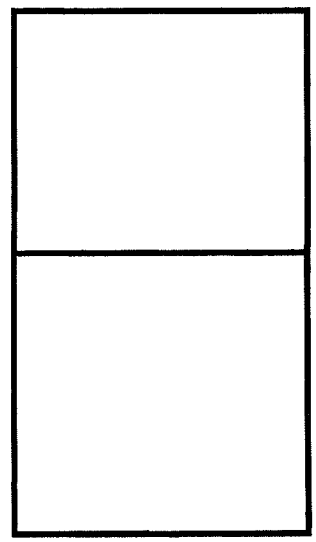
FIG. 1B shows two exemplary images having a vertical overlap.
Figure 1C:
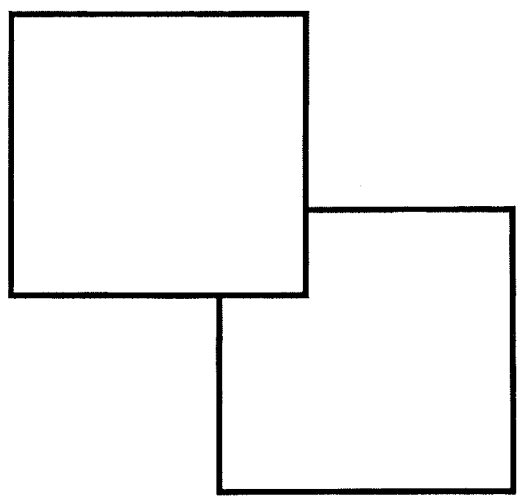
FIG. 1C shows two exemplary images having both a horizontal and a vertical overlap.

There are a great variety of imaging applications that generate multiple images of a single field of view or single object or grouped objects of interest. The multiple images can be overlapped in at least three ways. FIG. 1A shows two exemplary images having a horizontal overlap. FIG. 1B shows two exemplary images having a vertical overlap and FIG. 1C shows two exemplary images having both a vertical and a horizontal overlap. The amount of overlap needed or recommended for successful stitching (fusing) varies between applications. As will be described below, there should be available sufficient features in an overlapping region for the method to compare various mathematical attributes of features in templates selected within the overlapping region. In some applications, such as some medical radiography applications, there can be industry standards or professional practice guidelines suggesting or requiring certain overlap dimensions. In other applications, there can be experimentation and testing to determine sufficient overlap distances. As will be seen in more detail below, more efficient stitching algorithms are highly desirable in medical x-ray imaging, since a smaller overlap can in some cases be useful to minimize a patient's x-ray dosage. For example, patient dosage can be reduced by reducing the number of images needed to image a particular desired field of view.

Figure 2:
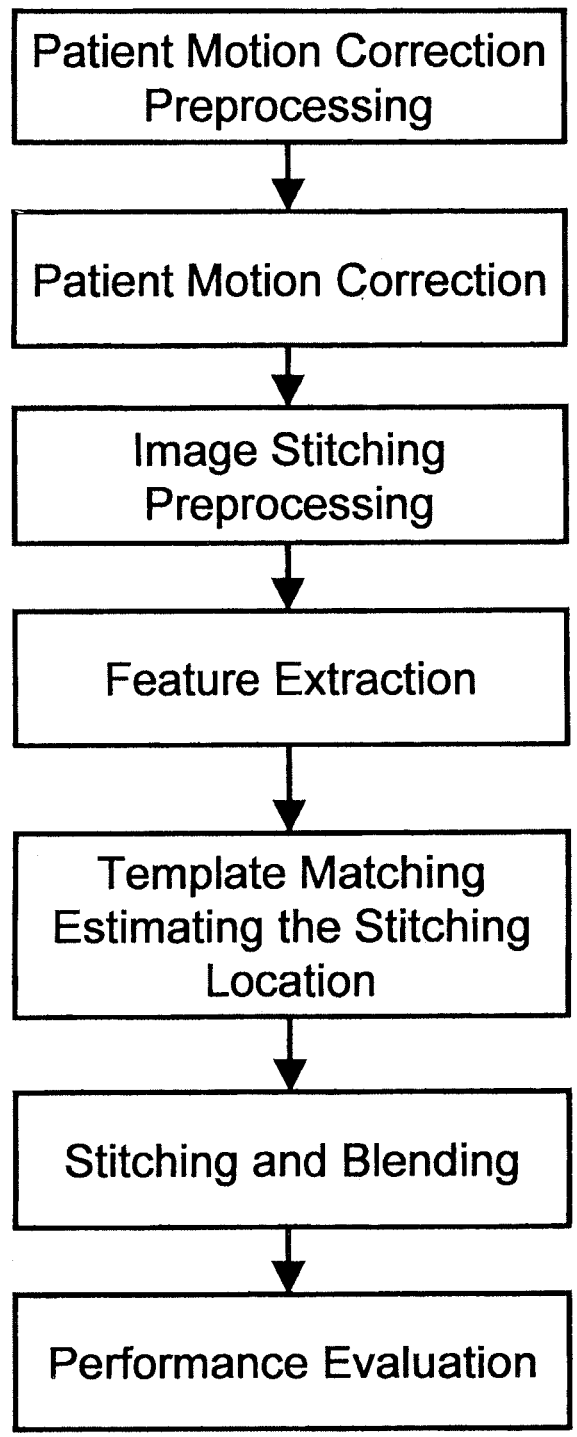
FIG. 2 shows a simplified block diagram of one embodiment of the image stitching method.

FIG. 2 shows a simplified block diagram of one embodiment of a stitching method that can accurately and efficiently fuse (combine) multiple sequences of images to create a single image of interest from multiple acquired images. The image stitching algorithm according to this embodiment can include the following steps: Image Motion Preprocessing, Image (fix figures) Motion Correction, Image Stitching Preprocessing, Feature Extraction from the Overlapping Region, Template Matching, Estimation of Stitching Location, Stitching, Overlap region extraction, Performance Evaluation, Blending, and Performance Evaluation.

The image motion correction preprocessing step selects the size of two sub-images based on the size of suggested or required minimum and maximum overlapped regions of two typically sequentially acquired images, whether vertically or horizontally displaced or a combination thereof. This image motion correction uses the two selected sub-images for estimation of a possible translation and rotation of the second image relative to the first one and then can compensate or correct the second image motion relative to the first one. The second motion corrected sub-image therefore has zero motion components relative to the first image. In the image stitching preprocessing step, the size and shape of the overlapped region in the first image, second image, and the template are determined. The step of feature extraction extracts and selects multi-resolution radon gray level, gradient, or range based features from the overlap region. The template matching algorithm can use 2D and 1D normalized cross correlation, normalized city block distance, and/or city block distance to estimate the stitching location. The blending algorithm combines the overlapped region to make the stitching seam substantially invisible. Finally, the performance evaluation algorithm quantitatively measures the stitching error or correlation in the joined region.

Figure 3:
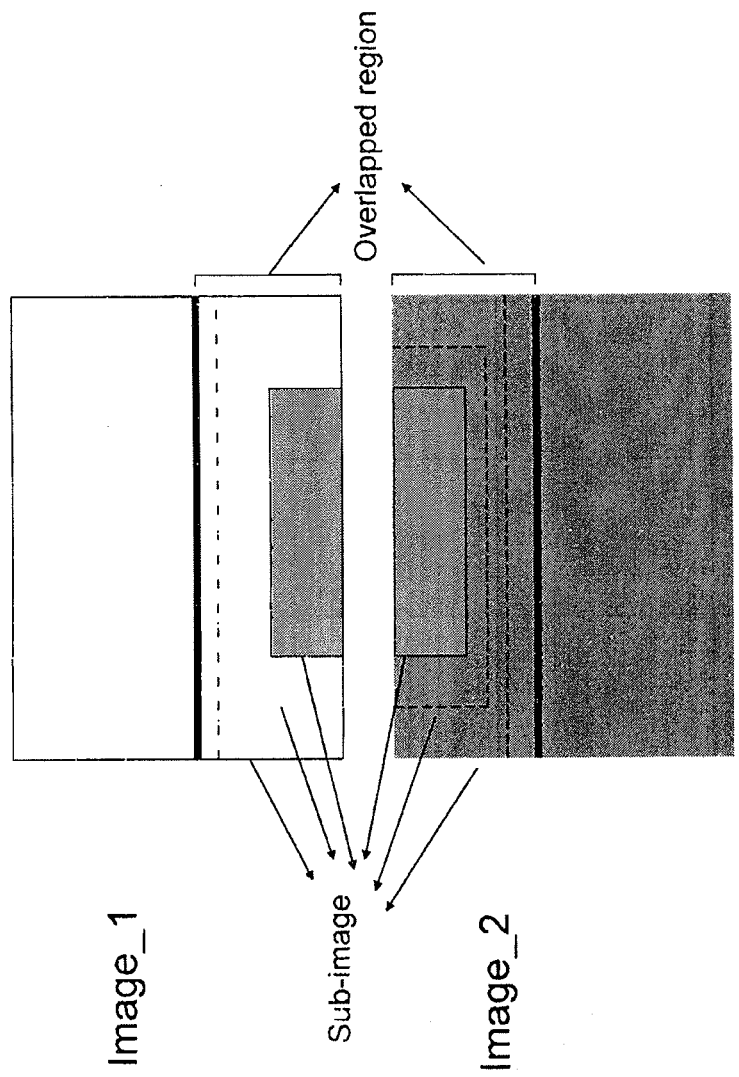
FIG. 3 shows exemplary sub-images useful for image motion estimation (rotation and translation) and image motion correction.

Each of the blocks introduced above are now discussed in more detail. In patient or image motion correction pre-processing, there can be three steps: select the size and shape of two sub-images in the overlapped region of two typically sequentially acquired images, use these two sub-images to estimate patient motion (translation & rotation), and use the estimated motion to correct the image for the patient motion. FIG. 3 shows exemplary sub-images which can be used for image motion estimation (rotation and translation) and image motion correction.

Image Motion Correction typically includes two steps. In the first step, translation and rotation component of the second image motion relative to the first image can be estimated. In the second step, the estimated motion can be corrected by the inverse motion transformation.

Figure 4:
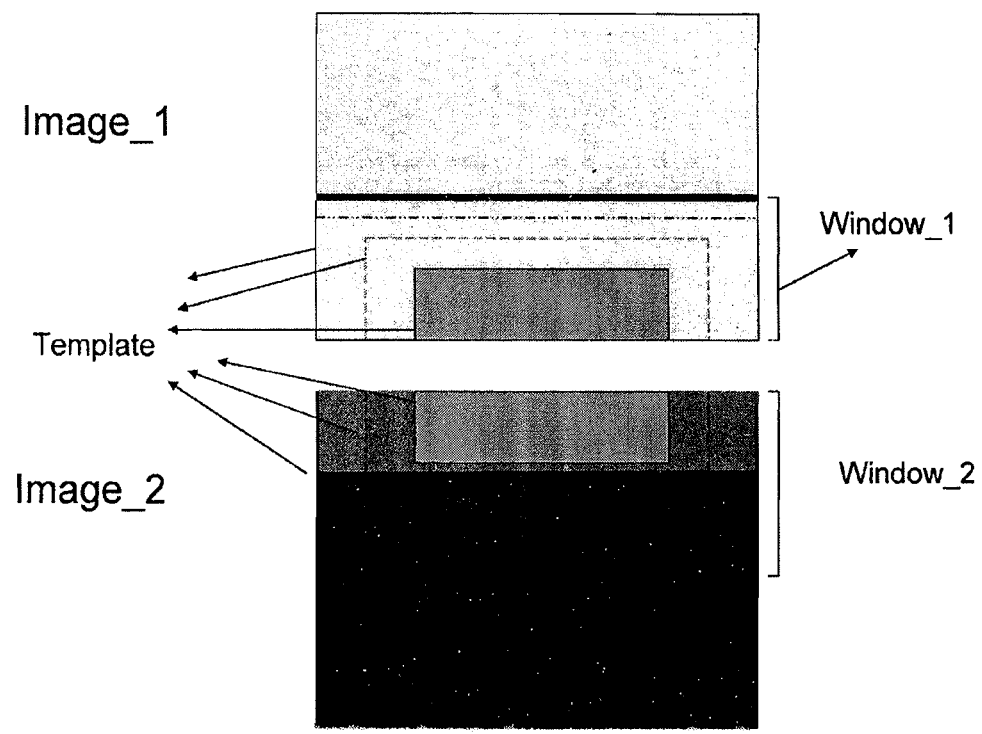
FIG. 4 shows exemplary sizes and shapes of windows from which features can be extracted.

Image stitching preprocessing includes a selection of windows from multiple images (typically, but not necessarily two sequentially obtained images). Later, features can be selected from each of the windows for further analysis. The windows are selected from an overlapping region of each of two images to be stitched together. Preferably, each of the selected windows lies entirely within the overlapping region between the images. FIG. 4 shows exemplary sizes and shapes of windows from which features can later be extracted. The sizes of these two windows depend on the size of overlapping region and on the size of the object of interest (e.g. bone, tissue, or spine in medical imaging applications). As shown in FIG. 4, the sizes of these windows can be configurable. Exemplary window sizes that have been used for images of M×N pixels include: 512×512 (about 3"×3"), 512×1024 (about 3"×6"), 512×2048 (about 3"×12"), and 512×2960 (about 12"×17". In some cases, the size of the template window can be selected as 128×512, 128×1024, 128×2048, 128×2960, 256×1024, 256× 2048, 256×2960, 384×512, 384×1024, 384×2048, or 384× 2960, and the size of the target window then selected based on the overlapped size. The following are suitable sizes: 3"<the vertical overlapped region between two sequentially acquired images <6": 512×512 (about 3×3"), 512×1024 (about 3"×6"), 512×2048 (about 3"×12"), 512×2960 (about 12"×17"). For: 3"<the overlapped<6", the following sizes for the target window have been used and are recommended: 1024×512 (about 6"×3"), 1024×1024 (about 6"×6"), 1024×2048 (about 6"×12"), 1024×2960 (about 6"×17").

The template size and shape is selected in a template window/image and a target window/image is used to search for a match for estimating the stitching location. The following are suitable sizes: 128×512, 128×1024, 128×2048, 128×2960, 256×1024, 256×2048, 256×2960, 384×512, 384×1024, 384× 2048, 384×2960, 512×512 (about 3"×3"), 512×1024 (about 3"×6"), 512×2048 (about 3"×12"), or 512×2960 (about 12"× 17"). The size of template can typically be determined based on the size of the overlapped regions, speed, and performance. There are some trade-offs. Generally, smaller overlapped regions and smaller template sizes yield faster stitching algorithm speeds. Larger templates and larger feature dimensions can give better stitching performance. The template size can also be substantially the same size as an overlapped region which is to be estimated. Note that either a relatively small template or a relatively large template can lead the algorithm to converge at a local minimum resulting in a less than optimal estimation of the stitching location.

Figure 5A:
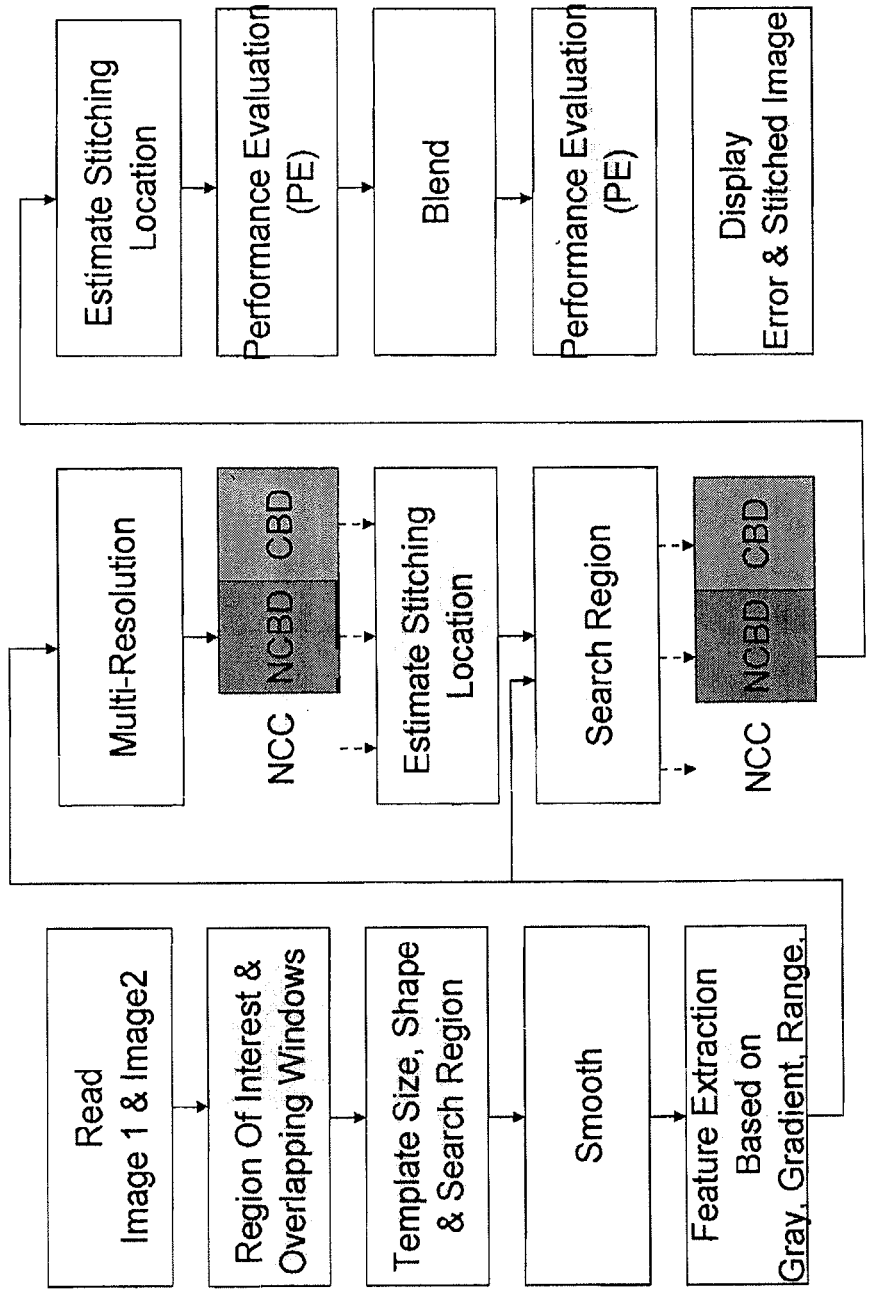
FIG. 5A shows a flow diagram of one embodiment of the image stitching method.

Turning to the exemplary block diagram of FIG. 5A, one embodiment of a general purpose image stitching method is now described in more detail. A computer, such as an embedded microcomputer, is typically programmed to perform the image stitching algorithm. The two images to be fused are first read from memory as follows: The computer can read a digital image into memory from a two dimensional (2D) detector. Or, more typically where the two images to be stitched have already been read from a detector, the computer can read or use the images from memory locations in which the digital images have been previously stored.

Continuing with FIG. 5A, a region of interest (ROI) and overlapping windows can be determined. It can be computationally wasteful to consider overlapping portions of either of the images to be stitched together that are outside of the ROI of the images. An early ROI determination of both images to be stitched together can increase the efficiency of the stitching algorithm. For example, rows or columns padded by zeros can be eliminated prior to performing the image stitching method. One suitable method to determine the ROI of an image was described in U.S. patent application Ser. No. 12/167,373, Imaging Auto Shutter ROI, filed Jul. 3, 2008 by the current inventor and also assigned to the InfiMed Corporation. The Ser. No. 12/167,373 application is incorporated herein by reference in its entirety.

Once the ROI of the images has been determined, template sizes, shapes, and search regions can be determined. Next, smoothing can be performed. Following smoothing, feature extraction based on Gray scale, gradient, and/or range is performed. Multi-resolution data of the extracted features can then be provided. The multi-resolution data can be analyzed using any suitable methods for feature analysis, such as Normalized Cross Correlation (NCC), Normalized City Block Distance (NCBD), and/or City Block Distance (CBD) routines as described in more detail below. To make a first "course" (rough) estimate of a stitching location, analysis of features can be done at a relatively low resolution. Based on the first estimate of a stitching location, a new search region can then be determined and NCC, NCBD, and/or CBD routines can again be performed using higher resolution data to refine the estimate of a stitching location. Next, a Performance Evaluation (PE) of the computed stitching location is performed. If the PE determines that the stitching location meets pre-determined quality or accuracy of stitching criteria, a blend is performed in and near the stitching region between the two images being stitched or fused together. If the PE determines that the stitching location does not meet the pre-determined quality or accuracy of stitching criteria, the feature selection, feature analysis, and stitching location estimation steps can be repeated. Another PE can be performed following the blending process. If the final post-blended stitched image meets a pre-determined final stitched image quality or accuracy of stitching criteria, the stitched image can be saved to memory and optionally displayed on a display unit. If the final post-blended stitched image does not meet a pre-determined final stitched image quality or accuracy of stitching criteria, the blending step can be repeated.

Figure 5B:
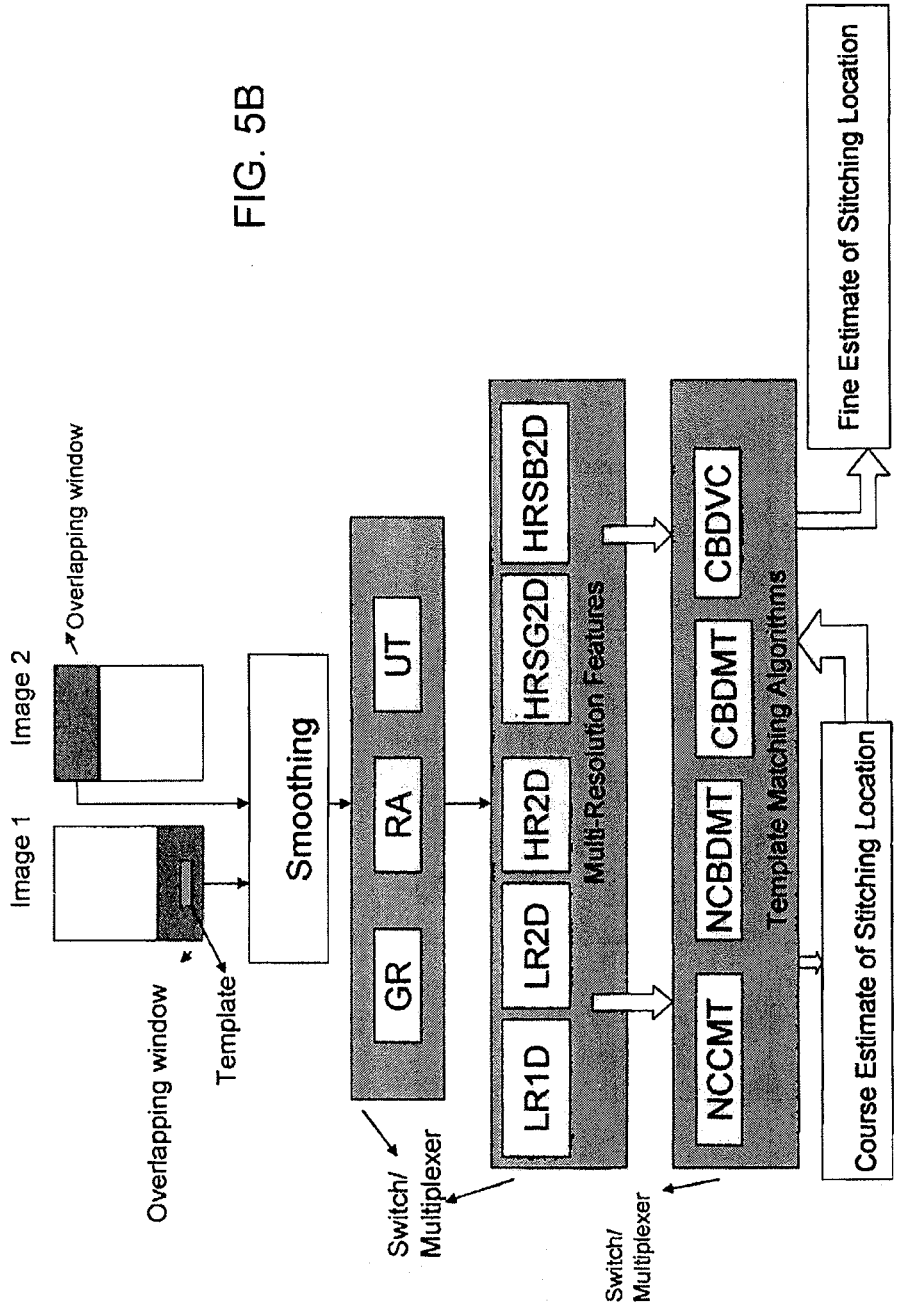
FIG. 5B shows a flow diagram of one embodiment of the image stitching method which emphasizes the iterative and multi-resolution nature of the image stitching method.

FIG. 5B shows a flow diagram of the image stitching method which emphasizes the iterative and multi-resolution aspects of the image stitching method. As described above, the image stitching algorithm can use low use low resolution features for a course estimate of stitching location and then use high resolution features to fine tune the course estimate. The functionality and acronyms of each block in the flow diagram of FIG. 5B are defined as follows: GR: Gradient; RA: Range; UT: Unity Transformation; LR1D: Low Resolution 1D; LR2D: Low Resolution 2D; HR2D: High Resolution 2D; HRSG2D: High Resolution Selected Gray 2D (gray means non-binary feature value); HRSB2D: High Resolution Selected Binary 2D; NCCMT: Normalized Cross Correlation 2D (Matrix); NCBDMT: Normalized City Block Distance 2D (Matrix); CBDMT: City Block Distance 2D (Matrix); and CBDVC: City Block Distance 1D (Vector). Various function blocks suitable for the image stitching methods as described in FIG. 2, FIG. 5A, and FIG. 5B, are now described in more detail.

FIG. 6 shows two numerical examples of image smoothing using 3×3 and 5×5 Gaussian kernels. 3×3, 5×5, 7×7 or larger size kernels can be used to replace every pixel value of the template window and the target window by weighted sum of its neighboring pixels in order to reduce additive nose. The weights are given by a selected kernel. The exemplary kernels shown in FIG. 6 were generated from the following 5×5 kernel by convolution, a well known image processing operation:

| 0.0030 | 0.0133 | 0.0219 | 0.0133 | 0.0030 |
| 0.0133 | 0.0596 | 0.0983 | 0.0596 | 0.0133 |
| 0.0219 | 0.0983 | 0.1621 | 0.0983 | 0.0219 |
| 0.0133 | 0.0596 | 0.0983 | 0.0596 | 0.0133 |
| 0.0030 | 0.0133 | 0.0219 | 0.0133 | 0.0030 |

FIG. 6 shows the weights of the resulting 3×3 and 5×5 Gaussian kernels. Such smoothing operations can be used to reduce both image noise and noise associated with the edge detection step.

Multi-Resolution Feature Extraction can be used to extract unique features in the overlapping region, which leads to a more accurate estimation of stitching location. Consider, for example, radiographically acquired images that consist of scatter radiation, tissue-gray-scale distribution, bone-gray-scale distribution and raw radiation. In such images, one goal is to extract the bone, tissue or both bone & tissue gray-scale distributions in the overlapping region. The feature extraction algorithm can utilize any suitable one dimensional (1D) or two dimensional (2D) multi-resolution features. Suitable 1D features can include 1D Radon transforms at zero angle (horizontal projection) based features such as: high resolution gray-scale, high resolution smoothed gray scale, high resolution edge, low resolution range, low resolution gray-scale, low resolution smoothed gray scale, low resolution edge low resolution range high resolution selected gray mean, high resolution selected gray sum, low resolution selected gray mean, low resolution selected gray sum, high resolution selected edge mean, high resolution selected edge sum, low resolution selected edge mean, low resolution selected edge sum, high resolution selected range mean, high resolution selected range sum, low resolution selected range mean, and low resolution selected range sum. Suitable 2D features can include: high resolution gray-scale, high resolution smoothed gray scale, high resolution edge, low resolution range, low resolution gray-scale, low resolution smoothed gray scale, low resolution edge, low resolution range, high resolution selected gray, high resolution thresholded gray, low resolution selected gray, low resolution thresholded gray, high resolution selected edge, high resolution thresholded edge, low resolution selected edge, low resolution thresholded edge, high resolution selected range, high resolution thresholded range, low resolution selected range, and low resolution thresholded range.

Gradient Based Features (Edge Detection) can be used to extract edge based features. The edge detection technique is relatively less sensitive to noise than techniques relying solely on image intensity. In the example shown in FIG. 7A, 3×3 or 5×5 Sobel horizontal and vertical kernel were convolved with the template window and the target window. Then the square root of square of horizontal plus vertical Sobel gradient components were used to compute the EDGE magnitude for each pixel in the first and in the target window (eq. 1 and eq. 2). A Canny Edge detector can also be used.

The magnitude of EDGE strength can be computed using one of the following equations:

$$G = \sqrt{G_x^2 + G_y^2} \quad (1)$$

$$\text{Or, } G = |G_x| + |G_y| \quad (2)$$

And, EDGE orientation is given by:

$$\theta = \arctan\left(\frac{G_y}{G_x}\right) \quad (3)$$

Note that as shown in FIG. 7B, the vertical Sobel kernel is a transpose of the horizontal Sobel kernel.

Range Based Features (Range Detection) can be used to extract range information using a 3×3, 5×5, 7×7 or larger size neighborhood size window to replace every pixel value of the template window and the target window associated with the overlapping region. Range detection can be accomplished by finding the maximum and minimum in the neighboring pixels to compute the rage (max-min) using a convolution operator which is a kernel. In this case, a neighborhood window centered at each pixel under consideration slides from pixel to pixel to compute the range information based on each pixel neighborhood values.

Radon Transform Based Features can be extracted using the Radon transform, a projection of a 3D or 2D object electromagnetic property along a radial line oriented at a specific angle (a line integral). For example, a radiographically based acquired image is a Radon transform of object absorption. For image stitching applications, Radon transforms at zero angles, (horizontal projections) can be particularly suitable in order to reduce computational complexity. The algorithm can use horizontal projections from either of the extracted low or high resolution: gray-scale, smoothed gray-scale, gradient-magnitude, and range features. FIG. 8A shows a numerical example of a horizontal projection which transforms a 2D image into two 1D signals using horizontal and vertical projections. FIG. 8B shows an exemplary graphical projection of a Radon transform.

Figure 9:
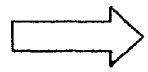
FIG. 9 shows a numeric example demonstrating how gray values can be selected from an image using a binary mask.
Figure 10:
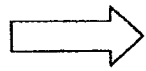
FIG. 10 shows a numerical example of a horizontal projection using the horizontal mean of mask selected gray values.
Figure 11:
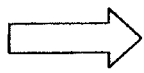
FIG. 11 shows a numerical example of a horizontal and vertical projection using both the horizontal and vertical mean of mask selected gray values.

Selected gray values can be used to extract gray levels of interest. Gray levels of interest can, for example, correspond to an object (bone) or objects (bone & tissue) of interest. The numerical example of FIG. 9 shows how gray values can be selected from an image using a binary mask where the mask values are set to 1 where gray scale values are greater than 7 and less than 21. Horizontal and/or vertical projections of selected gray scale values can also be performed. As shown in the example of FIG. 10, horizontal and vertical projections can be modified by use of a binary mask, such as the binary mask used in the example of FIG. 9. Horizontal & vertical means of selected gray values can also be used for feature extraction. FIG. 10 shows an exemplary horizontal projection using the horizontal mean of mask selected gray values. FIG. 11 shows an exemplary horizontal and vertical projection using both the horizontal and vertical mean of mask selected gray values.

Also, a "Binary Image" algorithm can "threshold" the template window and the target window associated with the overlapped region based on the each window minimum and maximum. Thresholding can be used to compute one upper or one lower & one upper limit thresholds and then based on predetermined thresholds, such as automatically computed thresholds, generate a binary image. A stitching algorithm can use the threshold method to extract dominant features, such as lines for estimating the stitching location. The threshold method with a computed lower threshold of 1.25*minimum and upper threshold of 0.25 maximum has been used with success. FIG. 12 shows the transformation of an exemplary image of gray scale values to binary image values using the threshold method. In the exemplary transformation of FIG. 12, image values greater than 7 and less than 21 were set to 1 and all remain values set to zero. The binary image algorithm can be used with a vertical and/or horizontal projection of the binary image. FIG. 13 shows both horizontal and vertical projections of the binary image of FIG. 12.

In summary, unique feature extraction can include matrix based features, vector based features, and Radon transforms (at single or multiple angles). Matrix based features include gray levels, gradients, and range information. Vector based features and Radon transforms can include (using gray values or gradient values) horizontal and/or vertical means, horizontal and/or vertical selected means, and horizontal and/or vertical selected threshold sums. Radon transforms can include horizontal and/or vertical means, horizontal and/or vertical selected means, and horizontal and/or vertical selected threshold sums are typically, but not necessarily, performed at a zero angle.

Template matching algorithms can be used to measure similarity or dissimilarity between two images or two signals. Once a template has been selected from the template window, the second "target" window can be searched for an image most similar to the image of the template. Typically, a template selected from the template window, is matched with a second window, the "target window" by searching in the target window for the most similar image to the template. There are a variety of similarity distances which are capable of measuring the similarity between two images. Template matching algorithms have been considered, developed, and evaluated which can increase efficiency by reducing the computational cost. Exemplary suitable matching algorithms include: mean square distance, least square, and Euclidian distance. Suitable mean square distance, least squares, and Euclidian distance mathematical methods and algorithms are now described in more detail.

As shown below in eq. 4 and eq. 5, distances can be expressed as a 2D or 1D Euclidean distance.

2D Euclidean Distance:

$$D(T, W) = \frac{1}{MN} \sum_{i=1}^{M} \sum_{j=1}^{N} [T(i, j) - W(i, j)]^2 \quad (4)$$

and, 1D Euclidean Distance:

$$D(T, W) = \frac{1}{M} \sum_{i=1}^{M} [T(i) - W(i)]^2 \quad (5)$$

where D(T,W) is the distance between two images, T(i,j) is the template image, and W(i,j) is the target window associated with the overlapped region.

Suitable 2D & 1D Normalized Cross Correlation equations include:

2D Normalized Cross Correlation:

$$D(T, W) = \frac{\text{Covariance}(T, W)}{\sqrt{\text{Variance}(T) * \text{Variance}(W)}} \quad (6)$$

$$= \frac{\frac{1}{MN} \sum_{i=1}^{M} \sum_{j=1}^{N} [(T(i, j) - \overline{T}) * (W(i, j) - \overline{W})]}{\sqrt{\frac{1}{MN} \sum_{i=1}^{M} \sum_{j=1}^{N} [(T(i, j) - \overline{T})]^2 * \frac{1}{MN} \sum_{i=1}^{M} \sum_{j=1}^{N} [(W(i, j) - \overline{W})]^2}}$$

This is equal to:

$$\frac{\sum_{i=1}^{M} \sum_{j=1}^{N} [(T(i, j) - \overline{T}) * (W(i, j) - \overline{W})]}{\sqrt{\sum_{i=1}^{M} \sum_{j=1}^{N} [(T(i, j) - \overline{T})]^2 * \sum_{i=1}^{M} \sum_{j=1}^{N} [(W(i, j) - \overline{W})]^2}} \quad (7)$$

and, 1D Normalized Cross Correlation:

$$D(T, W) = \frac{\text{Covariance}(T, W)}{\sqrt{\text{Variance}(T) * \text{Variance}(W)}} \quad (8)$$

Suitable 2D & 1D City Block Distance equations include:

2D City Block Distance:

$$D(T, W) = \frac{1}{MN} \sum_{i=1}^{M} \sum_{j=1}^{N} |T(i, j) - W(i, j)| \quad (9)$$

and, 1D City Block Distance:

$$D(T, W) = \frac{1}{M} \sum_{i=1}^{M} |T(i) - W(i)| \quad (10)$$

Suitable 2D & 1D Normalized City Block Distance equations include:

2D Normalized City Block Distance:

$$D(T, W) = \frac{1}{MN} \sum_{i=1}^{M} \sum_{j=1}^{N} \left| \frac{T(i, j)}{\sqrt{\mathrm{Var}(T)}} - \frac{W(i, j)}{\sqrt{\mathrm{Var}(W)}} \right| \quad (11)$$

and, 1D Normalized City Block Distance:

$$D(T, W) = \frac{1}{M} \sum_{i=1}^{M} \left| \frac{T(i)}{\sqrt{\mathrm{Var}(T)}} - \frac{W(i)}{\sqrt{\mathrm{Var}(W)}} \right| \quad (12)$$

Figure 14:
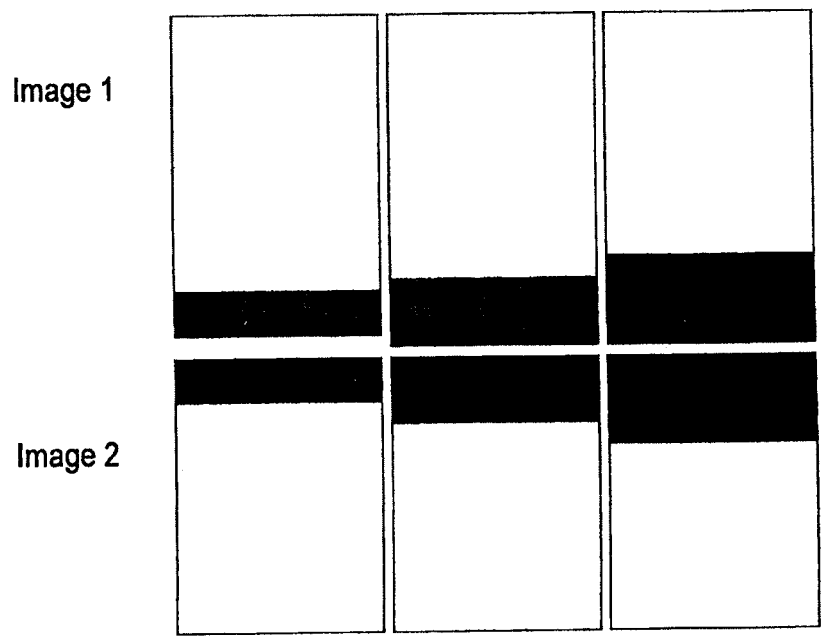
FIG. 14 illustrates an exemplary overlapped region of a first and second image for three different estimates of a true overlapped region.

Turning now to the estimation of the stitching location, where an exemplary overlap is only vertical, searching can be started at a "search row". One or more of the above similarity distances can be used to measure the distance between the template and the corresponding image in the overlapped region can be used. Searching can be continued until a best match is found. One technique is to compute a matching score for each search and then to find a best match by comparing the computed matching scores. Once a "best" match is found, a particular row, such as the last row of a matched image in the target window (the overlapped region), can be used as an estimate of the stitching location. The estimate of the stitching location can include the number of rows in the overlapped region. By knowing the number rows in the overlapped regions as determined above, an overlapped region of image 1 and image 2 can be extracted. FIG. 14 shows an illustration of an exemplary overlapped region of an "image 1" and an "image 2" for three different estimates (identified by the variable W_hat) of a true overlapped region (W). Similarly, where an exemplary overlap is only horizontal, searching can be started at a "search column", and after a best match is found, a particular column, such as the last column of a matched image in the target window (the overlapped region), can be used as an estimate of the stitching location.

Qualitative and Quantitative evaluation of the estimate of the stitching location is now described in more detail. As shown in the block diagram of FIG. 5A, once there is an estimate of an overlapping region, the similarity between the overlapped region in image 1 and image 2 can be evaluated.

Qualitative Evaluation can be performed by extracting an overlapped region in image 1 and image 2, subtracting one image from the other, and then computing the absolute values of the difference and displaying a representation of the differences for visual and qualitative evaluation. Less accurate estimates of the overlapped region will show more prominent observable differences.

Quantitative Evaluation can be performed by using one or more of the following mathematical equations:

2D City Block Distance:

$$D(T, W) = \frac{1}{MN} \sum_{i=1}^{M} \sum_{j=1}^{N} |T(i, j) - W(i, j)| \quad (10)$$

2D Normalized City Block Distance:

$$D(T, W) = \frac{1}{MN} \sum_{i=1}^{M} \sum_{j=1}^{N} \left| \frac{T(i, j)}{\sqrt{\mathrm{Var}(T)}} - \frac{W(i, j)}{\sqrt{\mathrm{Var}(W)}} \right| \quad (11)$$

2D Normalized Cross Correlation:

$$D(T, W) = \frac{\mathrm{Covariance}(T, W)}{\sqrt{\mathrm{Variance}(T) * \mathrm{Variance}(W)}} \quad (12)$$

In some embodiments, there can be a visual evaluation of the acceptability of the computed stitching location. As part of a visual evaluation, an expert visually can label selected features in one or more acceptable stitched images. Then the labeled stitched images can be used to compute a Similarity Distance (SD) between the overlapped region in image 1 and image 2 for each labeled stitched image. Such techniques can be used as a calibration method or indication of what degree of matching of image features is acceptable in a given application or setting. For example, if it is determined that some number of visually acceptable stitched images have a SD<T, then in this type of setting or application, the threshold T can be used for some or all types of image stitching quantitative acceptance tests.

Turning now to blending, blending can be used to diffuse an image 1 with an image 2 using the estimate overlapped region. Blending causes the stitching seam gray level intensity differences to become substantially invisible. Blending thus minimizes the contrast at the stitching neighborhood. Eq. 13 below shows one exemplary blending algorithm:

alfa=(1*i)/(Numbe_Of_Rows_Overlapped_Region)

OVERLAP(i,j)=(1−alfa)*OVERLAP1(i,j)+
alfa*OVERLAP2(i,j)  (13)

For_all_(i,j)

The image stitching methods described herein were successfully tested using the MATLAB™ programming and simulation language. We note that in some imaging hardware installations, there can be additional algorithms used to correct for hardware caused parallax errors or site specific distortion. Such corrections can be well defined for particular types or implementations of imaging equipment. In some embodiments, parallax errors or site specific distortion can be corrected in each image to be stitched before the image stitching methods are applied. In other embodiments, parallax errors or site specific distortion can be minimal and therefore ignored.

Figure 15:
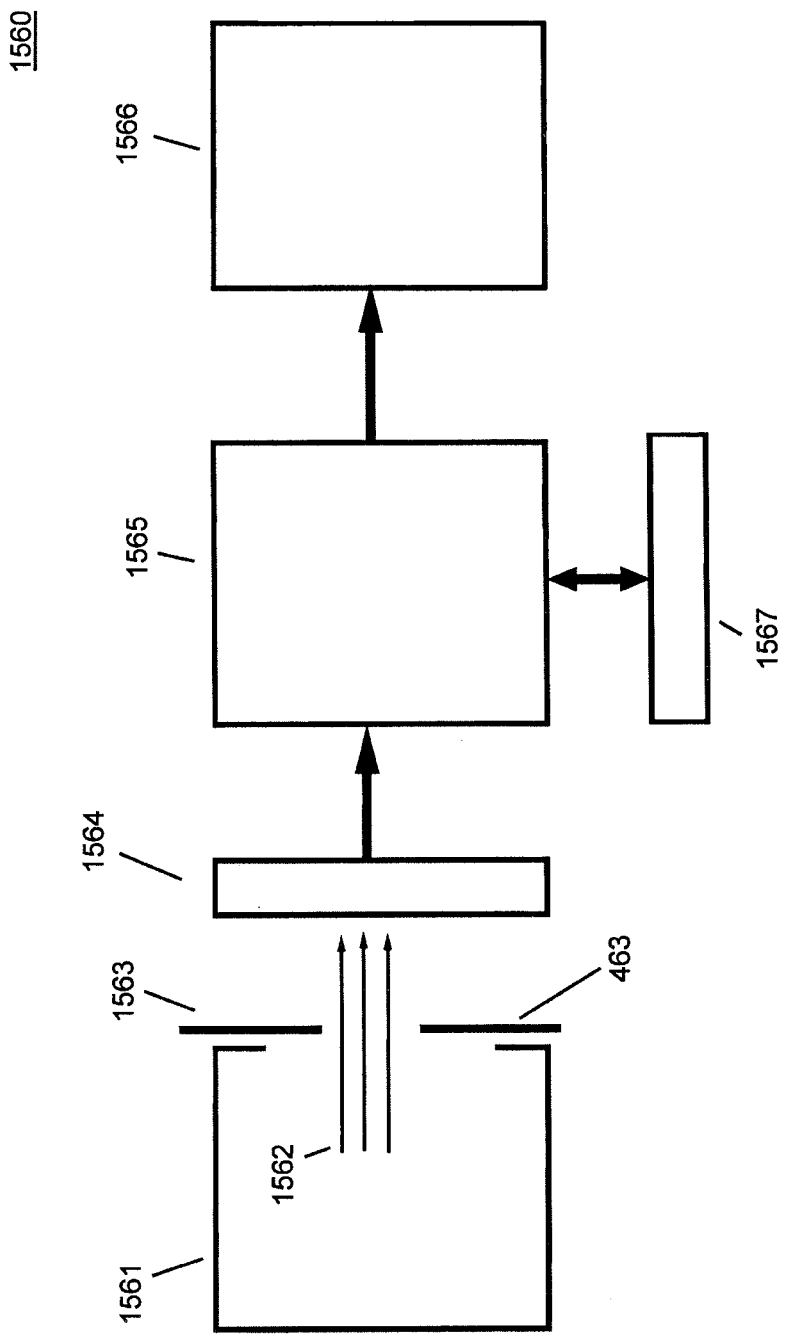
FIG. 15 shows a block diagram of an exemplary medical imaging system suitable for use with the image stitching method.

FIG. 15 shows a block diagram of an exemplary medical imaging system suitable for use with the image stitching method. The medical imaging system 1560 includes a source of imaging radiation 1561, typically an X-ray source. Moveable blades 1563 can set the aperture for imaging radiation 1562. Detector 1564 detects received imaging radiation 1562 (including absorbed, transmitted, and/or projected radiation) of the imaging radiation in a plane during an exposure, and corresponding image acquisition, typically creating a two dimensional (2D) image of the exposure. A medical imaging computer 1565 can include one or more microcomputers communicatively coupled to detector 1564. The medical imaging computer can also be configured to run an autostitching algorithm to stitch two, typically sequentially obtained, digital images. The stitched image data can be stored in memory such as is represented by memory 1567.

In medical applications, images of low or high resolution can be captured by a detector 1564, which can be a Flat Panel Detector (FPD) and a source of imaging radiation 1561 which can be an X-ray light source. As previously described, in many cases, such as in medical radiography applications, it might not be possible to capture the whole object of interest in a single field of view or a single image. Therefore, multiple views of an area of interest are typically acquired as multiple images by automatically (synchronously) or manually (asynchronously) moving the sensor and light source by techniques well known in the art of medical imaging. Physical movement of the sensor and light source can be horizontal only, vertical only, both horizontal and vertical, or rotational. In Digital Radiographic (DR) applications, both the X-Ray light source (source of imaging radiation 1561) and FPD (detector 1564) are typically moved vertically or horizontally in order to acquire multiple images (e.g. of a patient's spine or leg for scoliosis or long bone study for bone alignment, or for other physiological measurements). Also, as previously discussed, clinicians, generally prefer a single image showing "a whole region of interest" for medical study and diagnosis. Yet, because of the large size of some objects of interest, e.g. long bones, or a very high resolution requirement for a small object, multiple image acquisition is the only viable option. The improved stitching algorithms described herein can combine multiple images (e.g. sequences of images) into a single overall image of the region of interest.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the preferred mode as illustrated in the drawing, it will be understood by one skilled in the art that various changes in detail may be affected therein without departing from the spirit and scope of the invention as defined by the claims.

I claim:

1. A method to stitch images, comprising: determining a first Region of Interest (ROI) in a first digital image and a second ROI in a second digital image; determining a template window in said first digital image and a target window in said second digital image, wherein said template window comprises a template; extracting selected features from within said template at a first resolution; matching said selected features of said template at the first resolution to features in said target window to make a first estimate of a stitching location along a stitching edge; based on the first estimate of the stitching location, extracting selected features from within said template at a second resolution higher than said first resolution; matching said selected features of said template in said first digital image at the second resolution to features in said target window in said second digital image to make a second estimate of said stitching location along the stitching edge; stitching said first digital image and said second digital image using said stitching location to create a stitched image; and saving said stitched image to memory.

2. The method of claim 1, further comprising performing an evaluation of said second estimate of said stitching location.

3. The method of claim 1, wherein said template and said template window have substantially a same size.

4. The method of claim 1, wherein said template is equal to or smaller than said template window in size.

5. The method of claim 1, further comprising smoothing an image within said template and an image within said target window by use of a Gaussian kernel.

6. The method of claim 1, wherein said acts of extracting selected features comprise extracting selected one dimensional (1D) features, or extracting selected two dimensional (2D) features.

7. The method of claim 6, wherein at least one of said acts of extracting selected features is performed based on at least one Radon transform.

8. The method of claim 6, wherein at least one of said acts of extracting selected features is performed based on one or more of a gray-scale feature, an edge feature, and a range feature.

9. The method of claim 6, wherein at least one of said acts of extracting selected features is performed based on one or more of a selected gray mean feature, a selected edge mean feature, and a selected range mean feature.

10. The method of claim 6, wherein at least one of said acts of extracting selected features is performed based on one or more of a selected gray sum feature, a selected edge sum feature, and a selected range sum feature.

11. The method of claim 6, wherein at least one of said acts of extracting selected features is performed based on one or more of a thresholded gray feature, a thresholded edge feature, and a thresholded range feature.

12. The method of claim 6, wherein at least one of said acts of extracting selected features is performed based on one or more of a gray-scale feature, a smoothed gray-scale feature, a selected gray mean feature, a selected gray sum feature, and a thresholded gray feature.

13. The method of claim 6, wherein at least one of said acts of extracting selected features is performed based on one or more of an edge feature, a selected edge mean feature, a selected edge sum feature, and a thresholded edge feature.

14. The method of claim 6, wherein at least one of said acts of extracting selected features is performed based on one or more of a range feature, a selected range feature, a selected range mean feature, a selected range sum feature, and a thresholded range feature.

15. The method of claim 1, wherein at least one of said acts of matching is performed using a template matching algorithm.

16. The method of claim 15, wherein said template matching algorithm comprises at least one mean square distance computation.

17. The method of claim 15, wherein said template matching algorithm comprises at least one least squares computation.

18. The method of claim 15, wherein said template matching algorithm comprises at least one Euclidian distance computation.

19. The method of claim 1, wherein said stitching location falls substantially along a row or column.

20. The method of claim 2, wherein said act of performing an evaluation comprises determining at least one 2D city block distance.

21. The method of claim 2, wherein said act of performing an evaluation comprises determining at least one 1D city block distance.

22. The method of claim 2, wherein said act of performing an evaluation comprises determining at least one 2D normalized city block distance.

23. The method of claim 2, wherein said act of performing an evaluation comprises determining at least one 2D normalized cross correlation.

24. The method of claim 2, wherein said act of performing an evaluation comprises determining at least one 1D normalized city block distance.

25. The method of claim 2, wherein said act of performing an evaluation comprises determining at least one 1D normalized cross correlation.

26. The method of claim 2, wherein said act of performing an evaluation is performed based on a predetermined similarity distance obtained from one or more stitched images deemed by visual inspection to have an acceptable stitched quality.

27. The method of claim 1, further comprising performing a blending procedure using said second estimate of said stitching location using a blending algorithm:

$$alfa=(1*i)/(Numbe\_Of\_Rows\_Overlapped\_Region)$$

$$OVERLAP(i,j)=(1-alfa)*OVERLAP1(i,j)+alfa*OVERLAP2(i,j)$$

$$For\_all\_(i,j).$$

28. A method to stitch images, comprising: determining a first Region of Interest (ROI) in a first digital image and a second ROI in a second digital image; determining a template window in said first digital image and a target window in said second digital image, wherein said template window comprises a template; step for extracting selected features from within said template at a first resolution; matching said selected features of said template at said first resolution to features in said target window to make a first estimate of a stitching location along a stitching edge; step for extracting selected features from within said template at a second resolution higher than said first resolution; matching said selected features of said template at said second resolution to features in said target window at a second resolution to make a second estimate of said stitching location along the stitching edge; stitching said first digital image and a second digital image using said stitching location to create a stitched image; and saving said stitched image to memory.

29. An imaging system comprising: a source for providing imaging radiation, the source having a shutter; a detector for receiving the imaging radiation; and an imaging computer component communicatively coupled to said detector and configured to run an autostitching algorithm to stitch images together, wherein said autostitching algorithm is configured to read a first digital image and a second digital image, determine a first Region of Interest (ROI) in said first digital image and a second ROI in said second digital image, determine a template window in said first digital image and a target window in said second digital image, wherein said template window comprises a template, extract selected features from within said template at a first resolution, match said selected features of said template at said first resolution to features in said target window to make a first estimate of a stitching location along a stitching edge, based on the first estimate of the stitching location, extract selected features from within said template at a second resolution higher than said first resolution, match said selected features of said template at said second resolution to features in said target window to make a second estimate of said stitching location along the stitching edge, stitch said first digital image and a second digital image using said stitching location to create a stitched image, and save said stitched image to memory.

30. The medical imaging system of claim 29, wherein said source comprises an X-ray source.

31. The method of claim 2, further comprising iteratively performing: said act of extracting selected features to said act of performing said evaluation of said second estimate, until said evaluation of said second estimate yields a stitching performance at or better than a pre-determined stitching performance level.

32. The method of claim 28, further comprising performing an evaluation of said second estimate of said stitching location.

33. The medical imaging system of claim 29, further comprising perform an evaluation of said second estimate of said stitching location.

* * * * *